United States Patent [19]
Simionescu et al.

[11] Patent Number: 5,963,650
[45] Date of Patent: Oct. 5, 1999

[54] METHOD AND APPARATUS FOR A CUSTOMIZABLE LOW POWER RF TELEMETRY SYSTEM WITH HIGH PERFORMANCE REDUCED DATA RATE

[76] Inventors: Dan Simionescu, 3400 S. Ocean Blvd. Suite 3D, Highland Beach, Fla. 33487; Marius Todor, 2320 NE 48 St., Lighthouse Point, Fla. 33064; M. Keith Vinson, 5881 Tower Bay Dr., Boca Raton, Fla. 33486

[21] Appl. No.: 08/847,194

[22] Filed: May 1, 1997

[51] Int. Cl.$^6$ .................................................. H04L 9/00
[52] U.S. Cl. .................................. 380/49; 380/9; 380/50; 380/59; 340/870.02; 340/870.03; 340/870.11; 705/412; 342/50
[58] Field of Search ..................................... 380/9, 49, 50, 380/59; 128/903, 904; 342/50; 367/76, 81; 379/106.01, 106.09, 106.11; 607/30, 32, 60; 340/853.1, 854.6, 855.4, 870.01, 870.02, 870.03, 870.11

[56] References Cited

U.S. PATENT DOCUMENTS

| | | | |
|---|---|---|---|
| 4,614,945 | 9/1986 | Brunius et al. | 340/870.03 |
| 4,830,757 | 5/1989 | Lynch et al. . | |
| 5,194,860 | 3/1993 | Jones et al. . | |
| 5,360,437 | 11/1994 | Thompson | 607/30 |
| 5,466,246 | 11/1995 | Silvian | 607/32 |
| 5,476,488 | 12/1995 | Morgan et al. | 607/30 |
| 5,477,216 | 12/1995 | Lee, Jr. et al. | 340/870.02 |
| 5,493,287 | 2/1996 | Bane . | |
| 5,528,507 | 6/1996 | McNamara et al. . | |

*Primary Examiner*—Bernarr E. Gregory
*Attorney, Agent, or Firm*—John C. Smith

[57] ABSTRACT

A customizable data acquisition device (DA) and a data collection system (DCS). The DA is remotely located for attachment to a variety of I/O devices, and uses an RF transceiver with a primary cache. A centrally located or mobile DCS with a secondary cache communicates with one or more DA's and stores DA data in the secondary cache. The DA has a programmable controller and an I/O interface capable of attaching to a variety of I/O devices. The DA primary cache holds data for bulk transfers to the DCS to minimize DA/DCS data transmission traffic. The DCS secondary cache accumulates data from the DA and allows data queries by multiple independent application programs (which may be located on the DCS, other DCSs, or remote host systems) without requiring retransmission of data from the DA for each query. Applications can query cached data in the secondary cache, and optionally query the primary cache or query the I/O device via the DA. Each DA is capable of peer to peer communication to allow DAs physically located outside of the transmission range of the DA/DCS to communicate with the DCS by routing data through other DAs in a network of DAs until the data can be transmitted to the DCS. I/O devices and DAs are shared by multiple applications in a hierarchical network of applications, host computers, DCSs, DAs, and I/O devices. A pass-through function allows the I/O interface to be emulated for software testing. When software testing is complete, the software is permanently stored in the DA.

29 Claims, 12 Drawing Sheets

METHOD AND APPARATUS FOR A CUSTOMIZABLE LOW POWER RF TELEMETRY SYSTEM WITH HIGH PERFORMANCE REDUCED DATA RATE

BACKGROUND OF THE INVENTION

1. Technical Field

The present invention relates to telemetry devices. In particular, it relates to the control of I/O, power, and communications in RF telemetry devices which have integral power conservation and communications functions, are capable of attachment to user designed data collection and/or control devices and can be monitored by one or more servers or networks simultaneously with minimal power consumption and data transfer rates.

2. Background Art

The use of telemetry devices has proven useful for a variety of monitoring and measurement systems. Telemetry systems have been designed for monitoring data which is collected from locations that cover a wide geographic area. An example of one variety of telemetry based system which uses remote data acquisition devices and a central data collection system is a consumer billing system used to take periodic measurements of utility meters, such as those used for gas, electric and water. The use of these systems eliminates the need to have a utility company employee take measurements from the meter. As a result, the cost of data acquisition can be sharply reduced by eliminating or reducing the amount of manual labor required in a conventional utility billing system.

In a billing environment, such as that discussed above, the data acquisition device will remain dormant for substantial periods of time and be activated only for periodic measurements which are taken on a monthly basis or on a demand basis such as when service is terminated or initiated. An important feature for automated data acquisition systems such as this is the ability of the automated data acquisition system to operate unattended for extended periods of time. Some of these data acquisition devices use conventional wire based telephone lines while other variations use RF transmitters and receivers to communicate with a central data collection system. Often, data acquisition devices are battery powered. As a result, battery longevity and drainage issues are important concerns in many telemetry systems.

RF based systems provide an additional advantage in that the data acquisition device can work with data collection systems which are mobile. By installing the data collection system in a vehicle, the distance between the remote data acquisition device and data collection system is reduced. Due to the reduced distance, the power required by the remote data acquisition device to communicate with the central data collection system can be reduced. As a result, battery power conservation is improved and data collection costs are reduced. This can be very important in locations where power cannot easily be provided to the data acquisition device. However, the energy used to transmit the RF data is significant. In a system where the data acquisition device is frequently queried, the data transfers can have a negative impact on power management and battery life. It would be desirable to minimize the number of data transfers to conserve battery power and extend battery life.

Another technique used to reduce battery power consumption is to place the data acquisition device in a "sleep" mode, whereby the device normally rests in a low power state until activated by a signal demanding a data reading. When the signal is received, full power is applied to the data acquisition device, the data (e.g. meter reading) is read, the data is transmitted to the data collection system, and the data acquisition device is placed back in the sleep state until the next measurement is required. In the case of applications such as utility meter reading, high power levels need only be maintained for short time period once a month, resulting in greatly improved battery life. Of course, this type of power reduction is more useful for devices as the frequency of data acquisition decreases. This method of power conservation is useful for applications, such as utility billing systems, where activity is infrequent. However, many RF telemetry applications are used to transmit data on a frequent basis. For example, in agricultural environments, frequent measurements are required to determine when equipment such as irrigation devices should be activated. Likewise, telemetry devices used in security systems may require frequent or continuous operation. As a result, the effectiveness of the sleep mode technique is reduced for applications which require frequent data transmission.

In the case where many data acquisition devices are used, such as in a utility meter environment, there can be significant delays when waiting to individually power up each data acquisition device in a large group. Known techniques provide for simultaneous powering up of groups of data acquisition devices to reduce this time delay. Known techniques accomplish this by broadcasting a single wake-up signal to a selected group of data acquisition devices. As each data acquisition device transmits its data, it can then return to sleep mode asynchronously.

Another method of reducing power consumption has been to store measurement data in the data acquisition devices until they are periodically polled by the data collection system. This method reduces power requirements by reducing the amount of communication between the data acquisition device and the data collection system. While this approach can be useful in a single application system such as that used for water treatment systems, etc., it is not effective in environments where multiple independent applications access the same data acquisition device. Multiple application environments will cause multiple transmissions, resulting in excessive battery drain, even if data is stored in the data acquisition device for periodic data transmission. It would be desirable to have a way to minimize data traffic in multiple application environments such that power drain due to excessive transmission rates are avoided.

Performance in data acquisition systems is also a concern. Transmission of data between a data acquisition device and the data collection system can impact system performance. As the number of data acquisition stations and/or user applications increases, the overall data traffic increases. In a multiple application environment, applications on the same server system can contend with one another for a given data acquisition device. Likewise, applications using different servers can also contend for a given data acquisition device. As the number of data acquisition devices increases and the complexity of the systems which use those devices increases, data acquisition systems require ever increasing amounts of processing power, both at the central computer and at the remote data acquisition device, to accomplish their tasks. One known technique stores data in the data acquisition device such that it can be transmitted on demand to the data collection system. However, multiple application systems using this method still require multiple redundant data transmissions for each application. It would be desirable to reduce the level of communication between devices, such that system resource consumption could be reduced by eliminating redundant transmissions.

The foregoing examples concentrated on utility meter data collection as a method of illustrating general data acquisition and power conservation concerns. However, those skilled in the art will recognize that a variety of applications exist for the collection of data, including industrial, manufacturing, financial, security, and agricultural, to name just a few. Industrial processes may require monitoring of materials as they are processed. Manufacturing plants can be designed to control activity and parts delivery on an long assembly line. Remote devices such as ATMs can be monitored for maintenance and security. Security systems are needed for monitoring homes and businesses. Agricultural uses include control systems for fertilization and irrigation. As can be seen, data acquisition systems can be used for numerous purposes. However, the same problems discussed above in regard to utility billing systems can appear in all of these other applications.

While addressing the basic desirability of maximizing battery life, the prior art has failed to provide a method of minimizing high power activities such as data transmission. Further, the prior art has not provided a method of minimizing contention in high data rate systems which have multiple independent applications which share use of the data acquisition devices.

SUMMARY OF THE INVENTION

The present invention solves the foregoing problems by providing a data acquisition device and a data collection system. The data acquisition device includes a primary cache, a detachable RF transceiver, and a user supplied sensor device. The data collection system includes a secondary cache. The detachable RF transceiver has a programmable controller and an I/O interface capable of attaching to a variety of user supplied sensor devices. The primary cache in the data acquisition device holds data for bulk transfers to the data collection system, and the transceiver can be placed in sleep mode between data transfers. A secondary cache in the data collection system holds data transferred from the data acquisition device. One or more applications can query cached data in the secondary cache, and when necessary, query the primary cache or query the sensor directly. Each data acquisition device is capable of peer to peer communication such that data acquisition devices outside of the range of the data collection device can communicate with the data collection device through other data acquisition devices. An optional emulator processor card allows external testing of software prior to insertion of the software into write once storage in the data acquisition device.

DESCRIPTION OF THE PREFERRED EMBODIMENT

Figure 1:
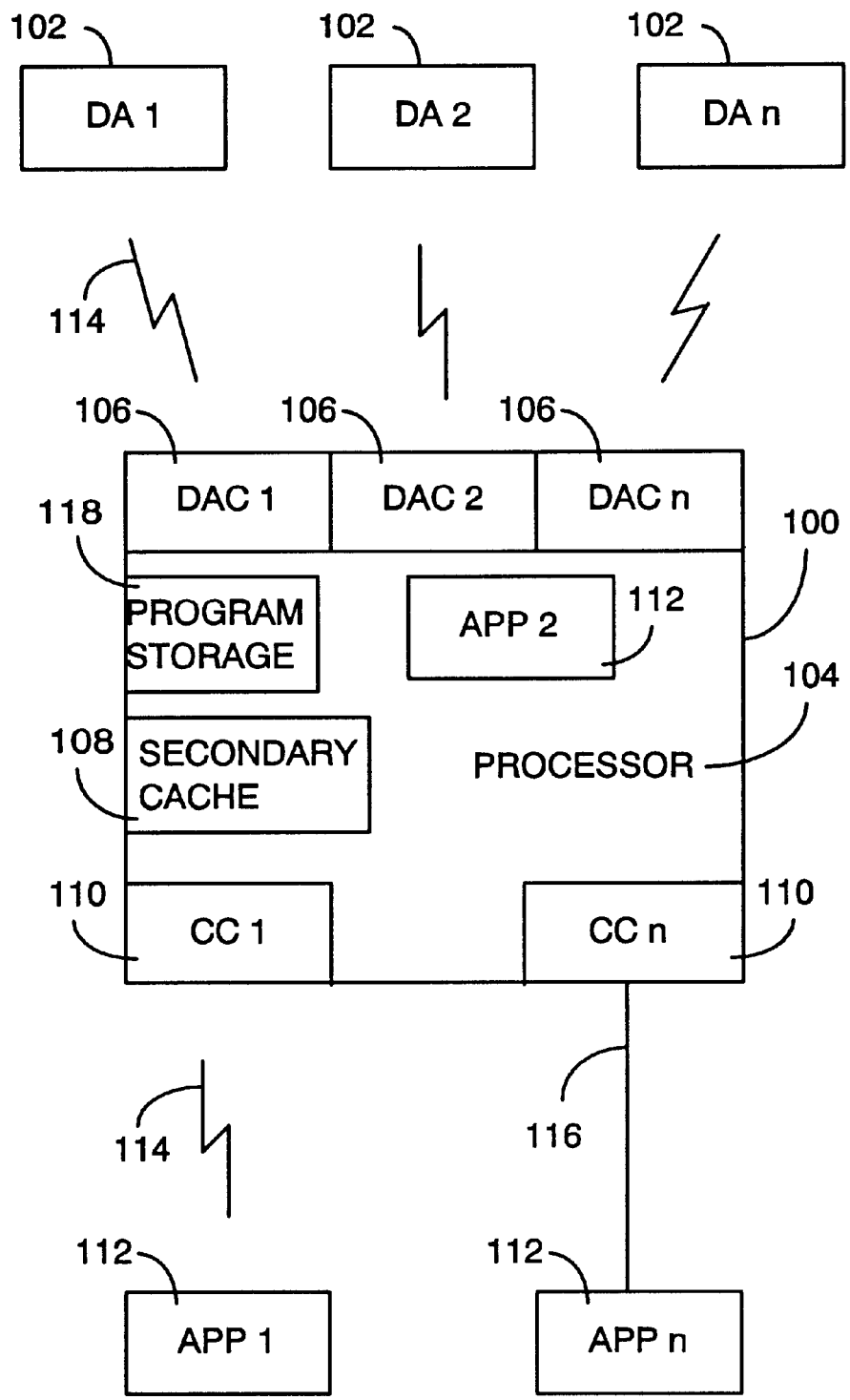
FIG. 1 is a block diagram showing the data collection system and its relationship to the data acquisition devices, and the user applications.

Prior to a detailed discussion of the figures, a general overview of the system will be provided. The system provides a remotely located data acquisition device which may be a sensor or unit of equipment which performs a specific active function, such as irrigation in agricultural environments or control of a manufacturing assembly line. The data acquisition device includes a unique cached programmable RF transceiver which has an I/O connector for attachment to a variety of I/O devices designed to perform user defined functions. The I/O connector frees the user from the need to design and manufacture the RF communications portion of the data acquisition device by providing a standard interface to the RF transceiver. In turn, this reduces the user's cost to provide a specific function at the remote location.

Further, the system is designed to reduce power consumption and improve overall system performance through the use of a dual cache arrangement which allows the data acquisition device to store data in a cache in the data acquisition device for transmission either on demand by a data collection system (typically a server or other computer) or under control of the internal programming in the RF transceiver. The cache in the data acquisition device is non-volatile and allows data from the user's I/O device to be stored between measurements or I/O device activities. By storing the data in this manner, power consumption can be reduced in several ways. First, power can be reduced or turned off completely in at least a portion of the RF transceiver when not needed. Second, the RF transceiver's programming can issue commands to the attached I/O device turn off the power on the I/O device when not needed to further reduce energy use. This allows substantial reductions in power usage or materials. Third, both the I/O device and the RF transceiver can be turned off. Fourth, the cache can be queried by a user application program without requiring the I/O device to be powered up. This provides faster response time from the remotely located data acquisition device to the data collection system.

The remote data collection system also has a cache to hold data received from the various data acquisition devices on the system. This cache further enhances performance and power conservation as follows. In a system where multiple independent user applications share the same data acquisition devices, they typically would not access the data acquisition device at the same time. Therefore, the data acquisition device may be called on to send the last measured data several times. This results in unnecessary power consumption at the data acquisition device and unnecessary data traffic between the data acquisition device and the data collection system. In a large system having many data acquisition devices the availability of RF frequency channels may further increase delays and cause queueing problems. By providing a secondary cache at the data collection system, the data acquisition device need only be accessed when necessary. As a result, both power consumption and performance are improved.

In systems which cover wide geographical or nationwide areas, many data collection systems may be linked together in a hierarchical or distributed server network, thereby allowing applications located on other computers or networks to access the data from a particular data acquisition device. By caching the data at the data collection system, substantial improvements in the overall system performance can be achieved. When global networks, such as the Internet, are used to access data acquisition devices worldwide, the use of the dual cache system described above becomes even more advantageous.

By combining the uniform I/O connection of the RF transceiver with the dual cache structure in the system, I/O devices can be fabricated with minimal expanse to the ultimate user since transmission design issues are minimized, performance is enhanced by eliminating unnecessary data transmissions, and power is conserved by reducing data acquisition station activity.

In addition, the RF transceiver includes a modifiable program storage. The program storage allows software to be downloaded to the RF transceiver for a variety of purposes. The software can be designed to perform specific activities with the I/O device, it can be used to perform diagnostics and maintenance functions, or to provide updated functions or software release levels. A significant advantage of the program storage is that in combination with the uniform I/O connector interface, it allows a single interchangeable RF transceiver type to be customized to work with a wide variety of devices, such as weather or security sensors, agricultural devices, manufacturing equipment, etc. Ultimately, the ability to attach an interchangeable RF subsection results in substantial saving due to reduced manufacturing and maintenance costs.

Another advantage of the intelligent RF transceiver in the preferred embodiment is that it is capable of peer to peer operation. For example, a user application can issue a command or query to one data acquisition device and that data acquisition device can then communicate directly with other data acquisition devices. This allows server workload to be greatly reduced by allowing it to offload work to the data acquisition device which would otherwise have to be performed by the server. In addition, the offload process can be dynamically altered to suit network performance requirements or to circumvent problems due to equipment malfunction.

Referring to FIG. 1, this figure shows an overview block diagram of the system. The data collection system 100 (hereinafter, "DCS 100") in the preferred embodiment is a server, but may be any suitable system such as a mainframe computer, personal computer, specialized hardware, etc. For ease of discussion, the term processor 104 will be used to describe the primary data processing circuitry. However, processor 104 can be a processor, multiple processors, a microprocessor, an intelligent microcontroller, etc. DCS 100 controls data collection between user applications 112 (hereinafter "APP 112") and data acquisition devices 102 (hereinafter "DA 102"). User applications may be any activity suitable for a system which requires data from a wide area to be transmitted to a central control point. For example, in a vineyard operation, each DA 112 could be a sensor device such as a weather station or ground water monitor, a unit of active equipment such as fertilizing or irrigation equipment, etc., or a combination of any of these devices. Each APP 112 can be used for a specific purpose such as water monitoring, fertilizing, etc.

In the preferred embodiment, APPs 112 can access any appropriate DA 102. The purpose and timing of each access can vary from APP 112 to APP 112. However, some of the data used by each APP 112 may be the same. Therefore, by caching the data, the DA 102 does not have to regenerate it for each APP 112. This figure also illustrates that APPs 112 can reside within the processor 104 or at a remote location which accesses DAs 102 through the DCS 100. As shown, remote APPs 112 are connected to processor 104 by client connectors 110 (hereinafter CC 110) via RF links 114 or conventional telephone links 116. Those skilled in the art will recognize that the CCs 110 can be any suitable hardware and software needed to convert received data and commands to a form suitable for the software in the processor 104. The techniques required to implement a CC 110 are well known in the art. Of course, any other suitable method of connecting the APPs 112 can be used, such as direct computer to computer cable connections. In the case of APPs 112, such as "APP 2", which are located on processor 104, the CC 110 would not be required.

Once a request for data is received, the processor 104 examines the secondary cache 108 to determine if the data is present. If it is, then the data is returned to the APP 112 without having to access the DA 102. This provides fast query response to the APP 112 and eliminates data traffic to the DA 102 entirely. If the requested data is not in the secondary cache 108, then the processor 104 initiates communication with the particular DA 102 via data acquisition device connector 106 (hereinafter DAC 106). In the preferred embodiment, RF links 114 are used to transfer data between DAs 102 and DACs 106. However, those skilled in the art will recognize that any suitable data transfer technology may be substituted. DCS 100 can also be programmed to automatically notify multiple APPs 112 whenever new data is received. Once the query or command sent by APP 112 is received by DA 102, the appropriate response or action is taken. Operation of the individual DA 102 is discussed in more detail in regard to FIG. 2, below.

For ease of illustration, only a few APPs 112 and DAs 102 are shown. However, the number of APPs 112 and DAs 102 is in practice limited only by the processing power required for adequate performance. Likewise, each remote APP 112 is illustrated with its own corresponding client connector 110 and each DA 102 is illustrated with its own corresponding DAC 106. However, those skilled in the art will recognize that individual paired units do not have to be made since data traffic would typically not be active for all APPs 112 at the same time. Therefore, a reduced number (i.e. a minimum of one) of DAs 102 and CCs 110 would be envisioned for the preferred embodiment. Ensuring that the appropriate DA 102 communicates with the appropriate APP 112 is accomplished via any suitable identification protocol for communication devices. The various components of DCS 100 have been shown as separate, however, in the preferred embodiment, the components are all incorporated into the server and may take hardware or software form where appropriate CC 110.

Figure 2:
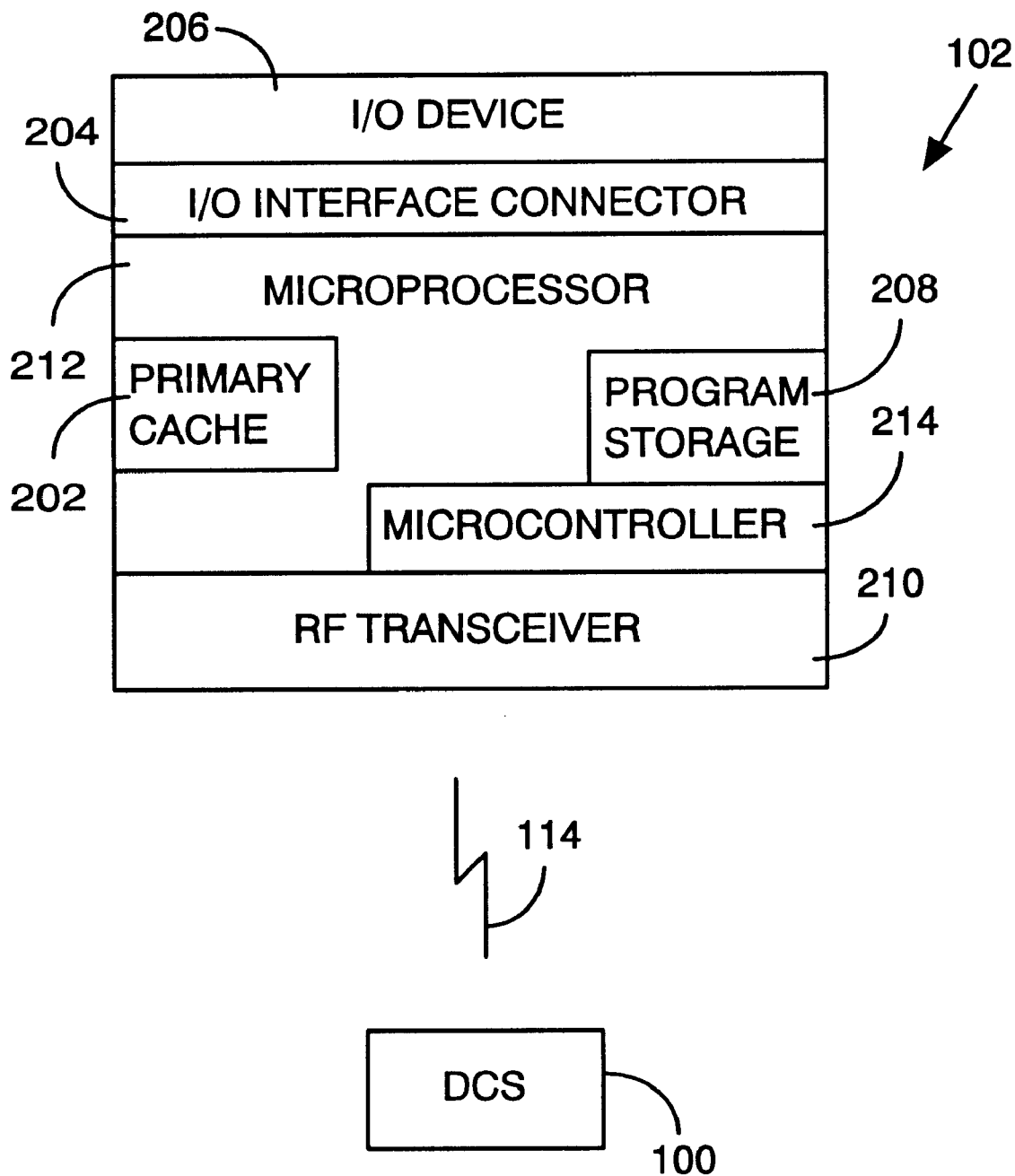
FIG. 2 is a block diagram showing the data acquisition devices and its relationship to the data collection system.

FIG. 2 provides a more detailed block diagram of the DA 102. The DA 102 includes RF Transceiver 210, primary cache 202, program storage 208, microprocessor 212, microcontroller 214, and I/O interface connector 204. For ease of discussion, RF Transceiver 210, primary cache 202, program storage 208, microprocessor 212, microcontroller 214, and the I/O interface connector 204 are shown as separate components. However, the preferred embodiment envisions these components as a single integrated component. I/O device 206 can be any suitable user designed unit required for a particular function. For example, it can be a weather station, irrigation equipment, manufacturing equipment, security system, etc. For ease of illustration, this figure illustrates the I/O device 206 as part of the DA 102. However, in practice the DA 102 can be attached directly to an I/O device 206 or it can be remotely attached via cable.

Primary cache 202 is used to store data and/or commands to or from the I/O device 206. By using the primary cache 202, a query from DCS 100 can be satisfied without activating I/O device 206 so long as the required data is in the cache 202. As a result, response time to the DCS 100 is improved. Further, if primary cache 202 is non-volatile storage then the DA 102 can be at least partially powered down when not needed, resulting in reduced power consumption. The advantage of I/O interface connector 204 is that it provides a convenient standard interface for the attachment of any number of I/O devices 206. In addition, program storage 208 can be preprogrammed with built-in networking software. In the preferred embodiment, a complete wireless networking protocol is stored in DA 102 which is capable of supporting both point to point and point to multi-point communications. In addition, source routing of messages is included in the stored program to allow the transmission distance of a DA 102 to be extended by routing messages across multiple DAs 102. As a result, the user of DA 102 is not required to have extensive knowledge of networking to implement an RF telemetry system. This reduces the user's cost of education and the cost which would be required to employ personnel with network expertise. This allows I/O devices 206 to be designed less expensively since the RF transmission requirements do not have to be imbedded in the I/O device 206.

An advantage of using a modular design for DA 102 is that it allows a user's I/O device 206 to be attached to an RF transceiver 210 which has been designed to meet government standards and which has a standard interface connector 204. A significant advantage of DA 102 is that the RF Transceiver 210, the primary cache 202, the program storage 208, microprocessor 212, microcontroller 214, and the I/O interface connector 204 form a sealed unit in which only the I/O interface connector 204 is exposed. The resulting device is then submitted for government approval prior to its use in combination with user I/O devices 206. By so doing, the user is relieved of the need to seek government approvals for the RF transceiver 210 and the need to develop expertise in radio design or communication protocols. Another advantage of the DA 102 is that the interface connector 204 includes access to the interface bus used by the microprocessor 212. This allows users to program microprocessor 212 locally. Of course, the RF transceiver 210 can also be used to download program changes from a remote location. As a result, the programming of the DA 102 can be updated either locally through the interface connector 204 or remotely through the RF transceiver 210.

The power usage of the DA 102 is minimized by keeping the microprocessor 212 in a low power standby state until needed. The microprocessor 212 can be powered down because of the microcontroller 214. In the preferred embodiment, microcontroller 214 is a low power device which monitors RF transceiver 210 for valid radio transmissions. When a radio transmission is detected, microcontroller 214 activates microprocessor 212 so that the RF transmission can be properly processed. In addition, microcontroller 214 can be programmed to periodically activate microprocessor 212 to perform scheduled tasks.

The RF transceiver 210 used in the preferred embodiment is a hybrid transmitter and receiver which meets both US & European emission regulations. The preferred embodiment has a data rate of 2000 bps. However, those skilled in the art will recognize that data rates vary based on circuit design, reception quality, bandwidth, etc. Therefore, the actual data rates in a particular environment will vary based on then current transmission technology and environmental factors affecting data transmission. Likewise, in the preferred embodiment output power and harmonic radiation comply with European Telecommunications Standards Institute (ETSI) 300 220, on 418 or 433.92 MHZ, and FCC Part 15 Rules & Regulations on 902–928 MHZ. However, these values would also be alterable to comply with appropriate government regulations. The Receiver implements pulse modulation decoding without a local oscillator or spurious emissions. Those skilled in the art will recognize that alternatives to the RF transceiver used by the preferred embodiment are available. For example, communication can be accomplished by infrared, microwave, etc. However, the RF transceiver in the preferred embodiment permits the broadest range of applications without the constraints of other technologies, such as the range or line of sight requirements of infrared.

Another feature shown by the foregoing figures is the shared hierarchal structure of the system. In particular, the DAs 102 may be shared by multiple APPs 112. This reduces the cost of implementing an application by allowing the cost of I/O devices 206 to be shared by several APPs 112. In addition, when more than one I/O device 206 is attached to a DA 102, a first subset of I/O devices 206 may be shared by a first APP 112 while a second subset (which may or may not overlap) of I/O devices 206 may be used by one or more other APPs 112. Likewise, the APPs 112 may reside on a single DCS 100, or be distributed over a hierarchal network of computers.

Figure 3:
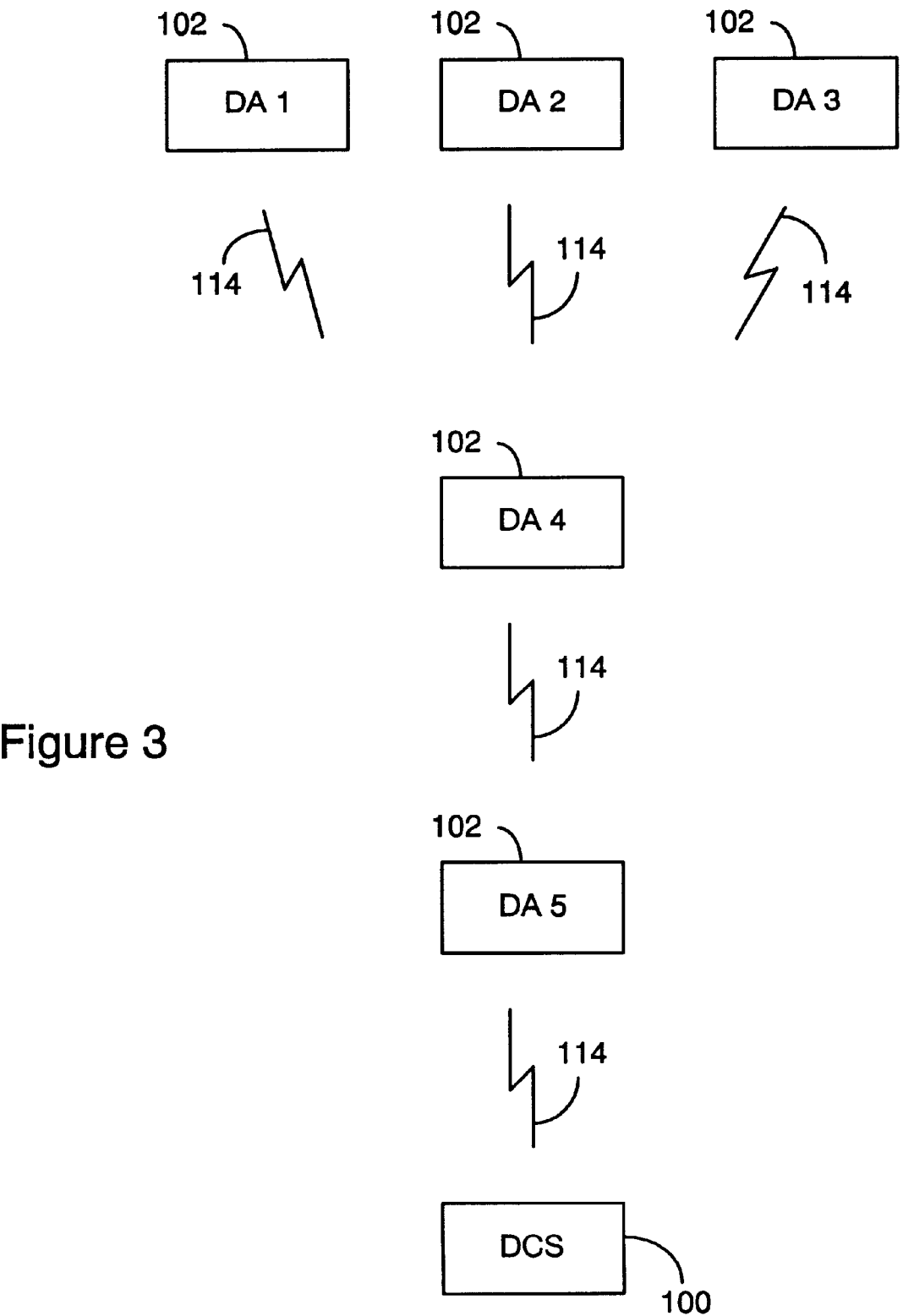
FIG. 3 is a block diagram illustrating data acquisition devices in a peer to peer configuration with data transfer between the data collection system and the data collection devices funneled through a single data acquisition device.

FIG. 3 illustrates another technique used by the DA 102 to reduce power consumption. This technique uses peer to peer data transfers to minimize the power required by the RF transceiver 210 by reducing the transmission distance required to contact the DCS 100. As shown in this figure, a remotely located DAs 102 (Numbers 1, 2 and 3) transfer data to DA 102 (number 4), which in turn transfers the data to DA 102 (number 5) which then transfers the data to DCS 100. This configuration allows a DCS 100 to receive data from a DA 102 which may be too remotely located to contact it at a low power setting. Those skilled in the art will recognize that the configuration of DAs 102 shown in this figure can be rearranged such that a variety of redundant data paths exist for transfer of data from any particular DA 102 to the DCS 100.

Figure 4:
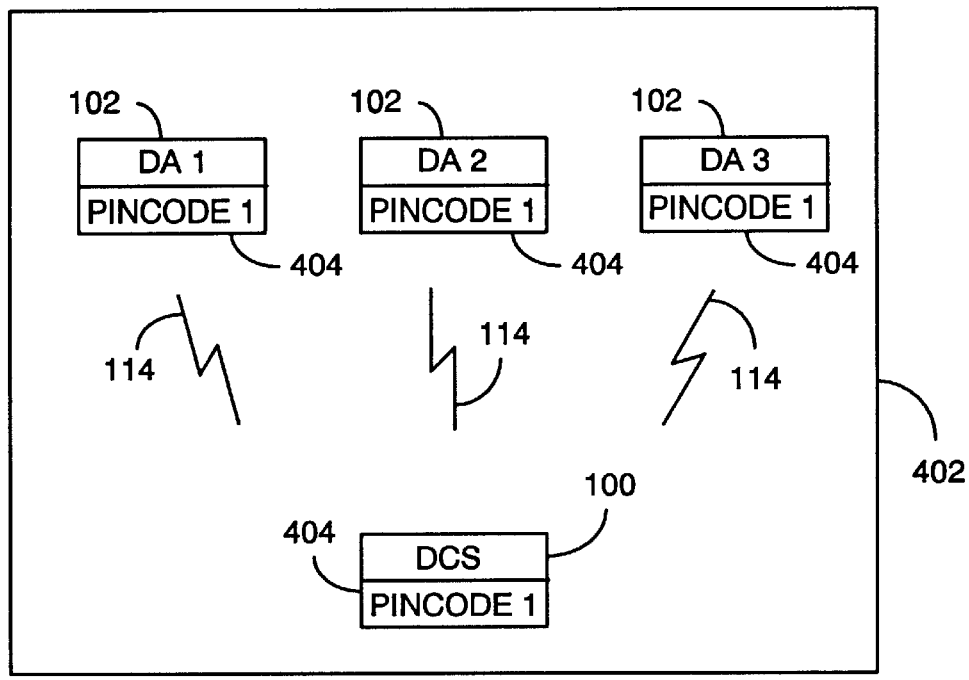
FIG. 4 is a block diagram of an alternative embodiment illustrating overlapping RF systems which use pincodes to distinguish one network from another.
Figure 4:
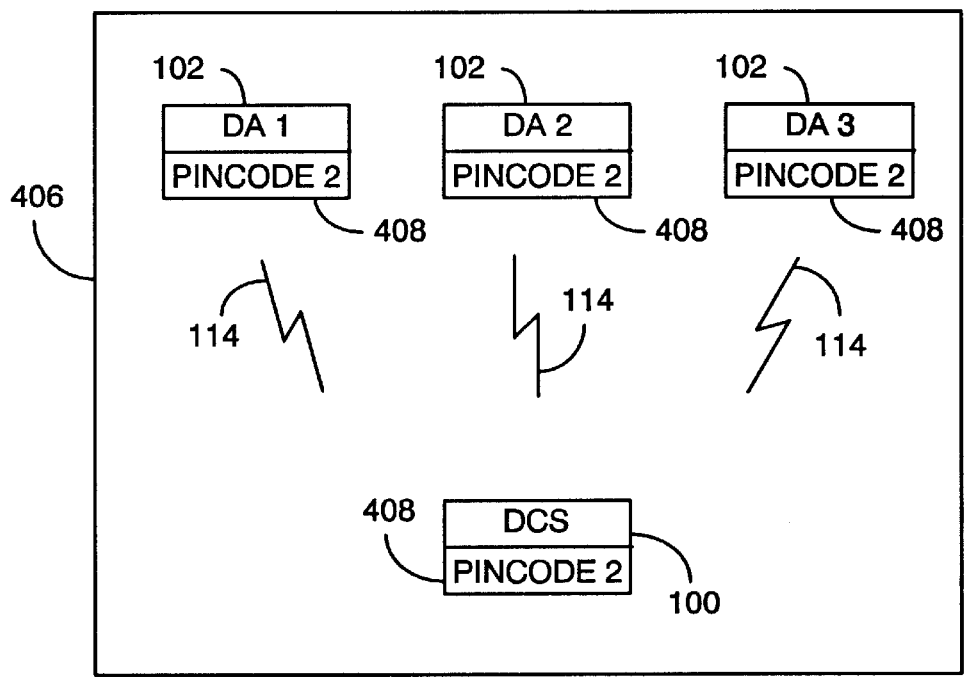

In FIG. 4, another embodiment is shown which is designed to eliminate interference between RF networks with close or overlapping areas. In this embodiment, each network 402, 406 uses pincodes to discriminate between RF transmissions which are internal to the network and RF transmissions which are external to the RF network. While the pincodes may be stored in a variety of locations, such as dedicated storage, hardware registers, etc, the preferred embodiment stores the pincode in program storage 118, 208. In the preferred embodiment, the pincodes are locally stored and not transmitted between the DA 102 and the DCS 100 to prevent unauthorized access to the pincodes. For ease of illustration, RF network 402 is shown adjacent to RF network 406. However, being able to discriminate between networks allows multiple networks not only to be closely located but even allows them to overlap. A variety of encryption techniques can be used to encode the RF transmission data. A unique feature of the preferred embodiment is its use of pincodes to encrypt the CRC data. In the preferred embodiment, the networks 402, 406 use pincodes 404, 408 to encrypt the cyclic redundancy check (CRC) data. CRC data is well known in the art. The pincodes 404, 408 are set during system initialization and are not transmitted to avoid their reception by other networks. In addition, the pincodes may optionally be user programmed such that the user can periodically change the pincode for security purposes. Encryption is most useful when RF networks are used by separate user applications in congested areas. For example, a typical residence has several utility services, such as water, electric, gas, cable, etc. It is possible that each of the various utility companies may have a DA 102 at a particular location. By using pincodes, the various devices can transfer data without interfering with one another.

In addition to using pincodes to determine whether a valid RF packet has been received, the preferred embodiment also uses forward error correction (FEC) with bit scrambling and data interleaving to decode damaged packets. As a result, the effective transmission distance is increased for DA 102.

Figure 5:
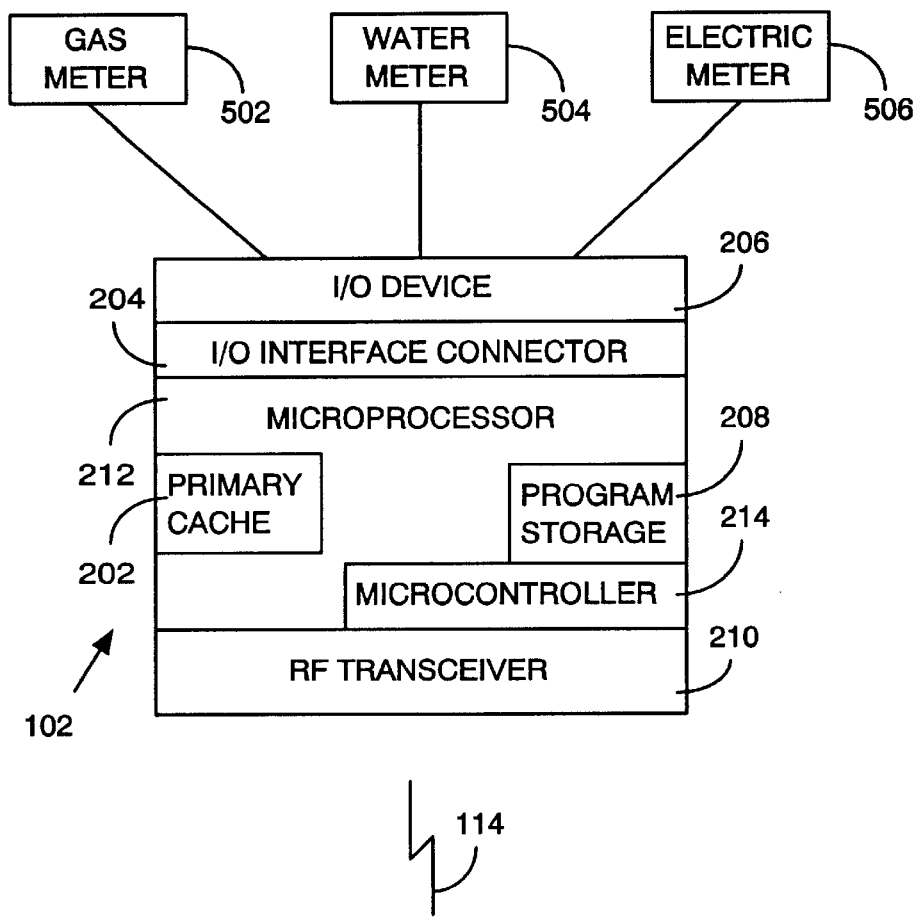
FIG. 5 is a block diagram of an alternative embodiment illustrating multiple application use of a data acquisition device and a data acquisition system.
Figure 5:
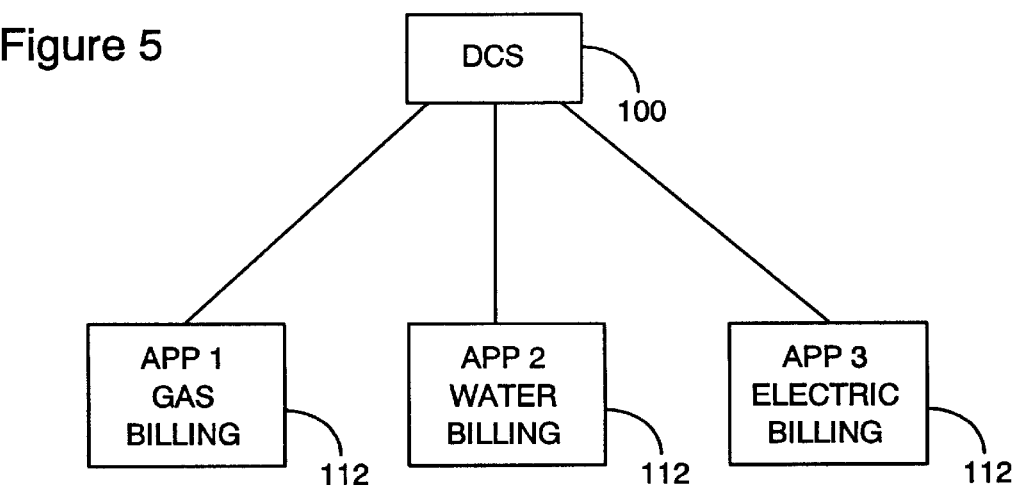

FIG. 5 illustrates another method of simultaneously reducing power and data transfer traffic. In this embodiment an I/O/ device 206 is attached to multiple sensors, which in this example are the gas, water, and electric meters 502, 504, 506 typically found at a residence. Each of the utility provider billing systems are represented by an APP 112. The DA 102 can be programmed to periodically (e.g. once a month) read the meters by issuing commands to the I/O device. The I/O device 206 can continuously read the meters or be powered down to conserve energy. In the preferred embodiment, the I/O device is kept in a low power state and activated under control of DA 102. When I/O device 206 is activated, it reads all of the meters 502, 504, 506 and transfers the measured data to DA 102. The meter data is then stored in the primary cache 202. The meter data from all three meters is then transferred to the secondary cache in the DCS 100 in a single transfer operation. By transferring the data in this manner, the DA 102 is fully powered up for a minimum amount of time, thus conserving energy. In addition, the transfer of all of the meter data in one operation reduces data traffic between the DA 102 and the DCS 100 resulting in improved performance.

When an APP 112 requests a meter reading, it uses a read request to the DCS 100. Since the DCS 100 has the meter data in its secondary cache 108, the data can be immediately transferred to APP 112 with no delay for data acquisition. This results in improved application performance for APP 112 since there is no delay for data acquisition. Each APP 112 can request data from DCS 100 asynchronously from the other APPs 112. However, due to the caching of measurement data within DCS 100, each APP 112 enjoys the performance benefit of immediate access to data in the secondary cache. In addition, since all of the data was transferred from the meters 502, 504, 506 in a single data transfer operation, the asynchronous requests for data by the APPs 112 are satisfied without the delays associated with multiple data requests to the I/O device 206. As can be seen, the dual caching method provided herein reduces power consumption by the DA 102 and/or the I/O device 206 while it simultaneously reduces data traffic between the DA 102 and DCS 100 and increases APP 112 performance.

Those skilled in the art will recognize that minor changes can be made to the foregoing method. For example, a meter reading may be initiated by the first APP 112 to request data for a billing period. When the APP 112 request meter data, the DCS 100 sends a command to the DA 102 which in turn commands the I/O device to transfer the meter data from all of the meters to its primary cache 202. The meter data for all of the meters is then transferred in the secondary cache 108 in the same manner as it was above. The APP 112 which made the request can then be provided with the meter data. The meter data for the other APPs 112 is then available in the secondary cache 108. Alternatively, the DCS 100, the DA 102 or the I/O device 206 can be programmed to automatically initiate the meter reading process at specified times.

The foregoing example used a single DA 102 in conjunction with a single DCS 100. However, in practice a billing system would more likely have multiple DAs 102 attached to each DCS 100, and multiple DCSs 100 providing data to a given APP 112. The DCSs 100 which provide data to an APP 112 can also be structured in a hierarchy such that a single DCS 100 collects data from the other DCSs 100 and transfers all of the meter data to an APP 112 on request. This results in still further improvements in performance by reducing data acquisition overhead for the APP 112. In addition, since the DAs 102 are capable of peer to peer communication, and since the DCSs 100 are capable of peer to peer communication, the system can be made fault tolerant by allowing data to be routed around malfunctioning equipment. This ability is provided the programmability of the DA 102 and the DCS 100.

The advantages of the system remain the same regardless of the application for which it is used. For example, a weather station would have multiple sensors, such as wind indicators, ground water detectors, thermometers, etc. Each sensor may be used by one or more applications. For example, in an agricultural environment, a weather station can be used by one application to control irrigation equipment. In addition, a second application can use the weather station to collect weather data for construction of a weather mapping software system. A third application can use the weather data to track weather conditions over time to determine when fertilization is required, etc. As a result, the cost of the weather station can be shared by multiple applications, each application putting the weather station to a different use. By caching the measurement data at the DCS 100, the applications can access data on a more timely basis and the network data traffic is reduced. As networks become larger, global access to data may be possible provided that the response time to gather data is sufficient. For example, the Internet allows weather data from DAs 102 located anywhere to be provided to a single APP 112. In a global system, communication delays can be a significant problem which the dual cache structure alleviates.

Figure 6:
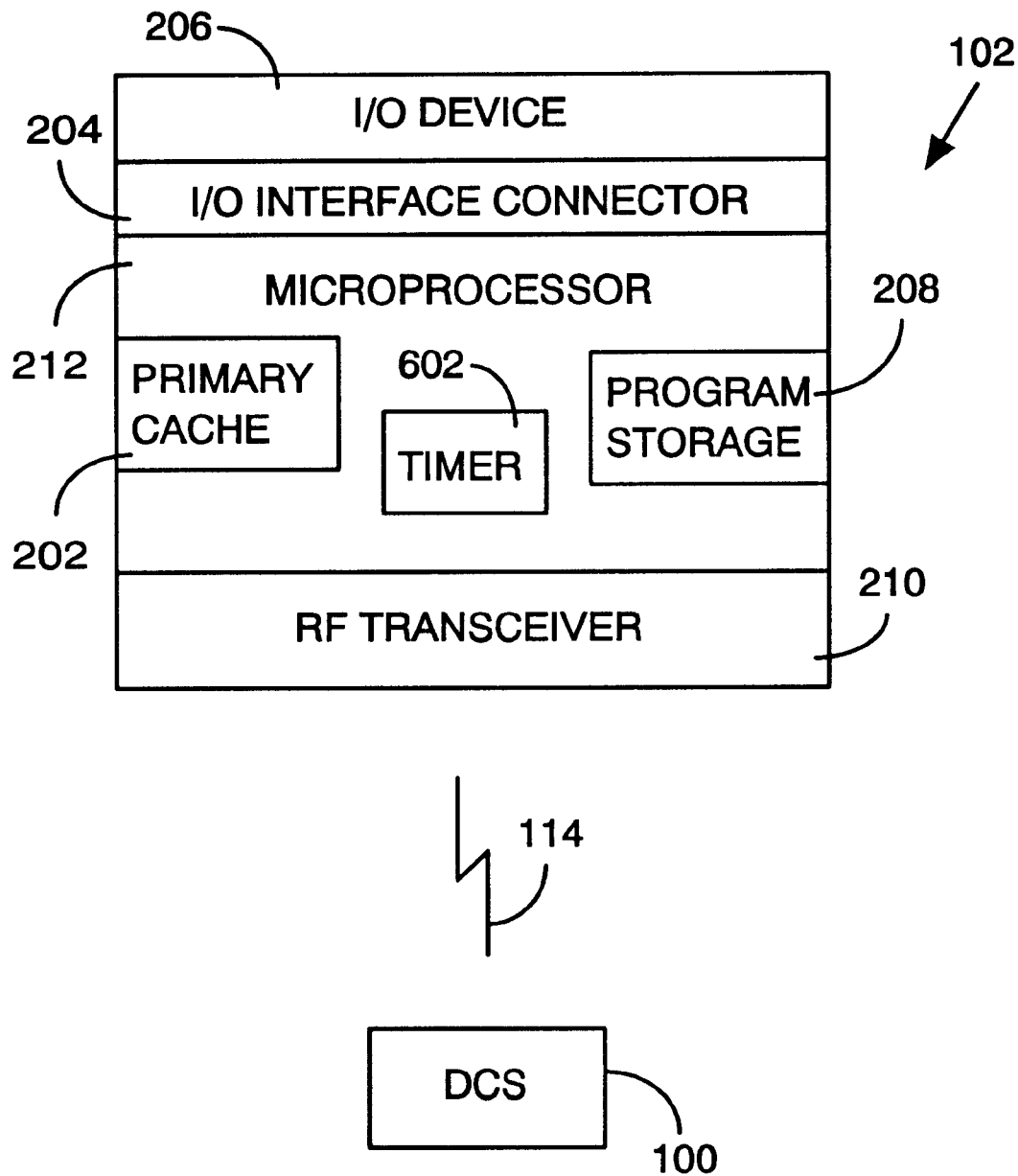
FIG. 6 is a block diagram of an alternative embodiment in which the microcontroller of FIG. 2 is replaced by a timer and the microprocessor is kept in a low power mode and activated periodically by the timer.

FIG. 6 is an alternative embodiment which eliminates the microcontroller 214 is replaced by a timer 602. In this embodiment, the DA 102 does not continuously monitor received RF data for a valid signal. Instead, power conservation is achieved by keeping the microprocessor 212 in a power down state most of the time and periodically waking it up to sample the received RF data for signals. Timer 602 can also be used to automatically initiate data transmission from the data acquisition device at preselected times. For example, when used for utility meters, it can automatically activate the DA 102 to read a meter and transmit the reading to the DCS 100. This completely eliminates the overhead which would be required if the DCS 100 had to poll the DAs 102 for meter data. Likewise, the timer could be used to automatically read weather equipment at specified times to see if irrigation equipment should be turned on, etc. Timer 602 provides the ability to initiate activities at the DA 102 without any interaction with DCS 102. As a result, overall performance of the entire network will be improved by eliminating communications with DCS 102 which may otherwise be required. Those skilled in the art will recognize that timers are well known in the art and timer 602 can be implemented in a variety of ways, including hardware or software. The following is a more detailed description of the DA 102 used in this preferred embodiment.

Figure 7:
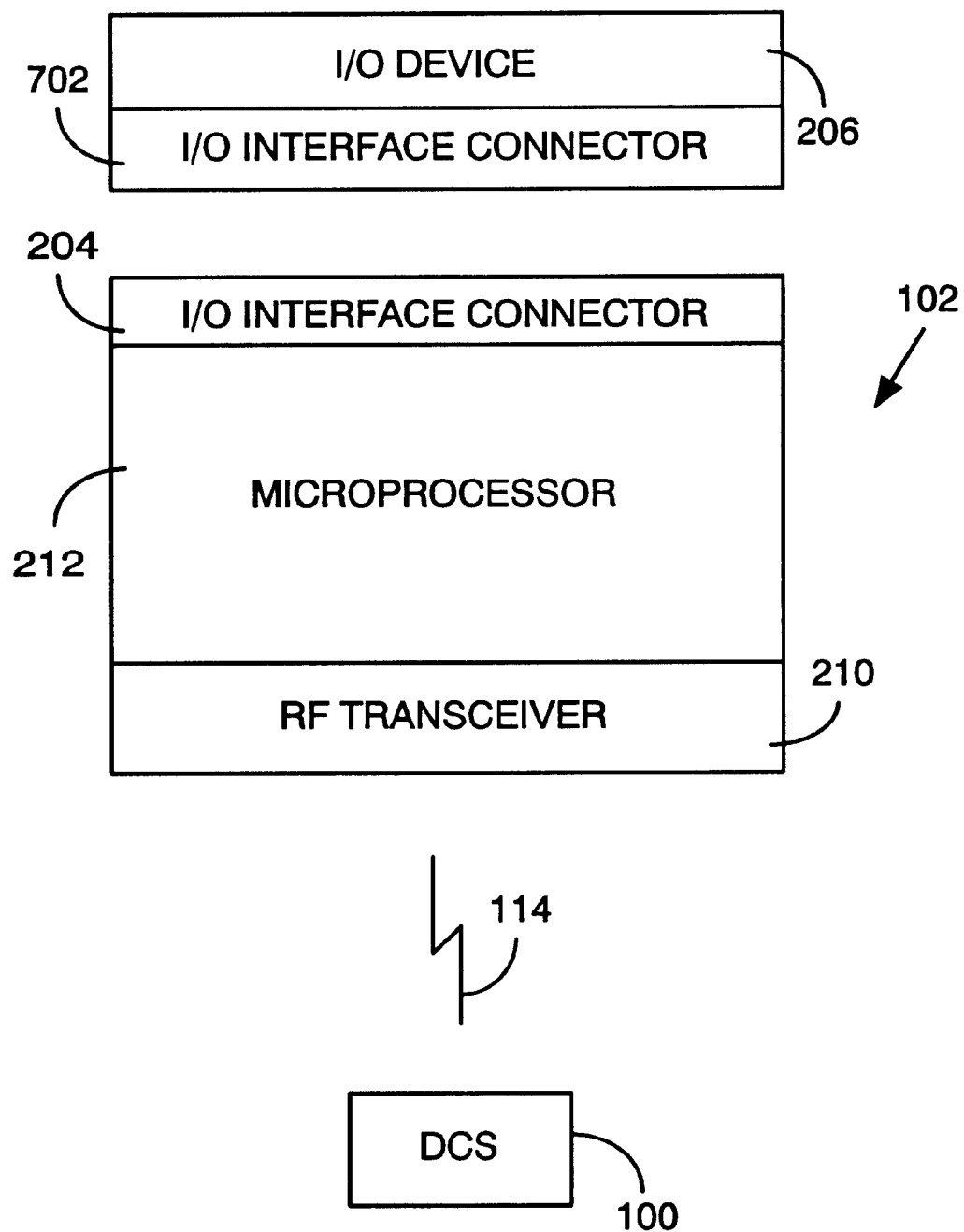
FIG. 7 is a block diagram of another alternative embodiment of the data acquisition device.

FIG. 7 illustrates another embodiment of the DA 102. In this embodiment, standard software applications can be pre-loaded before attachment to the I/O device 206. As noted above, I/O device 206 can be any devices, including passive sensors, computer controllable equipment, etc. There are three functional portions to DA 102: the RF transceiver 210, the microprocessor 212, and the I/O interface 204, all encapsulated in an environmentally sealed enclosure. In the preferred embodiment, the RF transceiver 210 consists of a transmitter and receiver (not shown), with pre- and post-amplification on both receive and transmit circuits, and complies with European Telecommunications Standards Institute (ETSI) 300 220, on 418 or 433.92 MHZ, and FCC Part 15 Rules & Regulations on 902 to 928 MHZ. Those skilled in the art will recognize that numerous other RF specifications are technically usable in addition to the foregoing. The microprocessor 212 uses an 8-bit, microcontroller, with 12 kb of programmable application storage of which 4 kb are user-accessible, 512 bytes of EEPROM data storage of which 400 bytes are user-accessible, and 2 kb to 32 kb bits of Serial EEPROM data storage, all user-accessible. EEPROM data storage data storage is well known in the art. The I/O interface 204 is a 14-pin standard connector. It can be configured as Analog, Digital, Asynchronous Serial I/O or SPI-Bus (the SPI-Bus is a synchronous bus). The unit may be connected to RS-232, 485, or Optical I/O device interfaces.

DA 102 is designed as a low-power device. It is powered by a 5–7 Volt DC supply, with 4-modes of power operation. Current consumption ranges from as low as 100 $\mu$A and up to 30 mA. As shown above, in FIG. 3, the DA 102 is also designed to function as a node in a mesh of RF-communicating devices, relaying information received from I/O devices 206 (which may be sensors or active devices), across the network in a daisy-chain form. Since each node is individually addressable, messages can be routed from source to destination via any number of nodes, without limiting the coverage area. The resident software loaded onto microprocessor 212 provides low-level functionality. As a result, very simplified function-calls and macros can then be used to configure and operate DA 102 with any type of I/O device 206.

Figure 8:
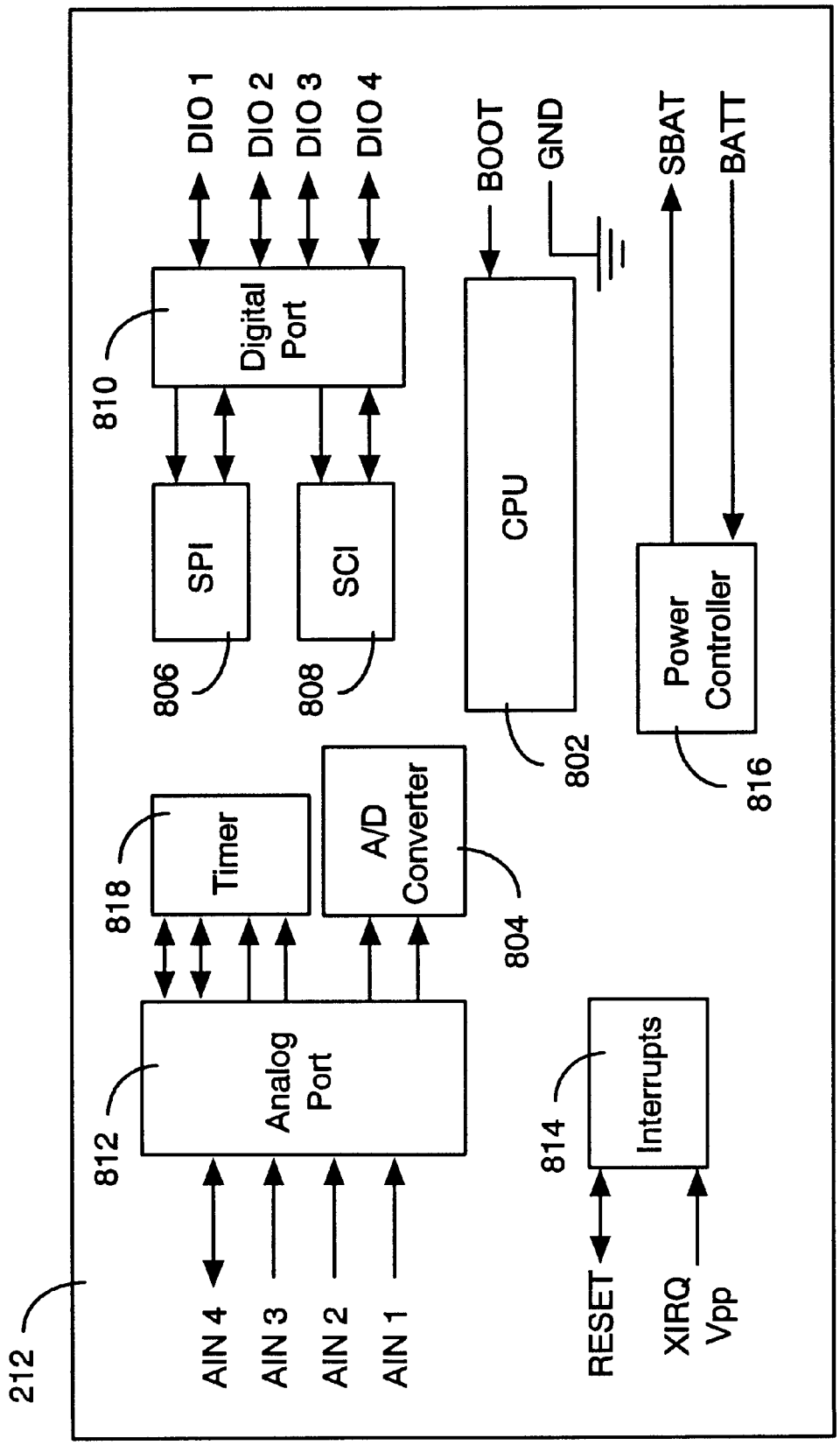
FIG. 8 is a detailed block diagram of the microprocessor used in the embodiment of FIG. 7.

FIG. 8 is a more detailed diagram of the microprocessor 212 used by the embodiment of FIG. 7. The microprocessor 212 can be any commercially available micro-controller suitable for the purposes of the invention. Those skilled in the art will recognize that a variety of suitable microprocessors are available, from firms such as Motorola and others, which combine powerful instruction sets with versatile bundles of peripherals. Major components utilized in the microprocessor 212 include CPU 802, analog-to-digital (A/D) converters 804, Synchronous Peripheral Interface (SPI) Bus 806 and an Asynchronous Serial Communications Interface (SCI) 808, as well as standard Digital I/O ports 810.

The asynchronous serial communication function of microprocessor 212 is provided by the asynchronous serial communication Interface (SCI) 808 is a full-duplex UART-type system, using standard NRZ format (1-start, 8/9 data bits, and a stop bit). The on-chip baud rate generator derives standard communication speeds from the micro-controller oscillator. Both transmitter and receiver are double-buffered, so that back-to-back characters can be handled easily, even if the CPU is delayed in responding. The SCI 808 transmitter and receiver are functionally independent but use the same data format and baud rate. The pins' voltages are set to TTL logic levels (0 V to 5 V), and so must be translated to the appropriate levels for EIA/RS-232 or EIA/RS-485. The SCI 808 can also produce queued idle or break characters, therefore allowing modem applications. Asynchronous serial communication functions of this type are well known in the art.

Self monitoring circuitry is included in the microprocessor 212 to protect against system errors, including a computer operating properly (COP) watchdog system, and a system reset. Using a 4.9152 MHZ crystal oscillator, the bus speed of the micro-controller is set to:

$$f_{bus}=f_c/4$$

There are four software-controlled power-saving modes that are employed in the design of the microprocessor 212 for all different power applications, including WAIT and STOP. The four modes of operation are as follows:
1. Transmit Mode:
   When RF transceiver 210 is turned on and sending data, the peak current drain of this mode is 30 mA for less than 1-Sec.
2. Continuous Receive Mode:
   In this mode, RF transceiver 210 and microprocessor 212 are continuously monitoring the radio link and I/O ports, waiting for an event to occur. As the event occurs, the message is processed immediately. Typically, this mode applies to systems with an unlimited power source, e.g. line power. The typical drain is approximately 5–7 mA.
3. Normal Mode:
   The RF transceiver 210 and microprocessor 212 are both in SLEEP mode, and wake up periodically (every 500 mS) to check for the presence of an event. If an event occurs, then the RF transceiver 210 and microprocessor 212 remain on in order to process the event. If, however, no event occurs, then the system returns to the SLEEP state. The average current drain in this mode is less than 1 mA. This is especially useful for rechargeable batteries or solar panels.
4. Power Saver Mode:
   The RF transceiver 210 and microprocessor 212 are in SLEEP mode. The microprocessor 212 is awakened every 500 mS to check the status of the digital I/O ports 810. If the digital I/O ports 810 require a transmission the RF transceiver 210 is turned on, a data transmission is sent and the RF transceiver 210 will wait for its acknowledgment. After receiving the acknowledgment it is turned off. This mode requires the least amount of power (<100 $\mu$A) and should be used where battery management is essential. This is especially useful for non-rechargeable batteries.

Those skilled in the art will recognize that various parameters such as the time periods between processor wake ups are not critical and can be varied. Therefore, the 500 mS periods discussed above should be considered as being merely exemplary. Likewise, changes in components and their associated power levels may also vary depending on the circuit technology used for a particular implementation of the devices. In addition to the power saving modes described above, DA 102 uses several other techniques to conserve power. Digital pattern recognition is used to recognize the RF packet's sync word. Digital signal strength or squelch level detection is used to control RF transceiver 210 power levels. Also, digital filtering is used to detect the presence of a valid RF carrier signal.

There are 3 different Input/Output interfaces available on microprocessor 212. Analog I/O, a digital I/O, and a serial port which may be configured as an asynchronous serial or an SPI Bus.

The analog inputs are 4 channels of an A/D converter 804 which are accurate to ±1 LSB. The E clock or an internal RC oscillator can be used to synchronize A/D converter 804 timing. The A/D converter system consists of four parts: multiplexer, analog converter, digital control, and result storage. A/D converters are well known in the art.

Figure 9:
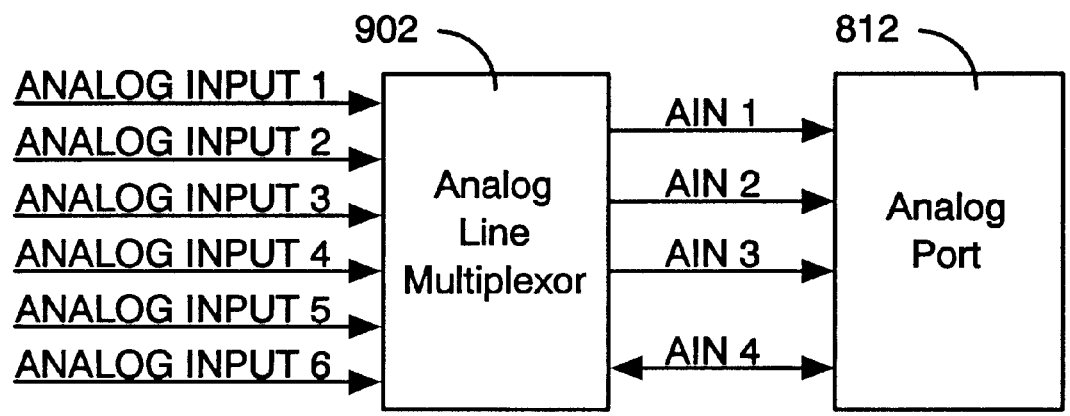
FIG. 9 is a diagram showing the pin layout of the I/O connector.

There are four analog input pins in the analog ports 812 of the microprocessor 212, three are uni-directional inputs, and one is a bi-directional input/output. The analog ports 812 are protected from over voltage latch-up and the current is limited by a 10 K ohm series resistor. These analog ports 812 can be configured as 4 analog inputs or 6 multiplexed analog inputs and one multiplexer control input. When 4 analog inputs are used they are defined as AIN 1 through AIN 4, and occupy pins 8–11 of the I/O interface 204 connector. When the unit is used to multiplex these inputs, AIN 4 becomes a digital control line and AIN 1 through AIN 3 are used as the multiplexed inputs. By way of example, FIG. 9 illustrates the use of AIN 1 through 4 to multiplex 6 analog input lines with analog line multiplexor 902.

Pins 8–11 of the I/O interface 204 can also be used for Timer functions. Pins 8–11 of the I/O interface 204 can serve as 4 general purpose I/O ports or for timer or pulse accumulator functions. These pins can be used as input capture, output compare, or pulse accumulator I/O functions. The following is an overview of each.

1. Input-Capture Function:

The input-capture function is a fundamental element of the microprocessor 212 timer architecture. For the device, physical time is represented by the count in a 16bit free-running counter. This counter is the central element in the main timer system of the microprocessor 212. Input capturing, used to record the time when some external event occurred, is accomplished by latching the contents of the free-running counter when the user defined edge is present at the related timer input pin. The time of an event is stored in the input capture register. By recording the times of successive edges on an incoming signal, the period and/or pulse width can be determined for an input signal. When measuring a period, two successive edges of the same polarity are captured. To measure pulse width, two alternate polarity edges are captured.

2. Output-Compare Function:

The output-compare function is another fundamental element of the microprocessor 212 timer architecture. All functions are based on the 16 bit free-running counter. For each of the output compare functions there is a separate 16-bit compare register and a dedicated 16-bit comparator.

An example of a use for this function is to produce a pulse of a specific duration. First, a value corresponding to the start of the pulse is written to the output compare register. The output compare is automatically configured to set the corresponding output to the proper state, depending on the polarity of the pulse being produced. After this compare occurs, the output compare is reprogrammed to automatically set the corresponding output back to its inactive level at the next compare. Since the pin-state changes occur automatically at specific values of the free running counter, the pulse width can be controlled accurately, independent of any software latencies. By repeating the actions for generating pulses, an output of a specific frequency and duty cycle can be generated.

3. Pulse Accumulator Function:

The pulse accumulator is an 8-bit counter/timer system that can be configured to operate in either of two basic modes: an event counting mode, or the gated time accumulation mode. In the event counting mode, the 8-bit counter is clocked to increasing values at each active edge of the AIN 4 pin. In the gated time accumulation mode, the 8-bit counter is clocked by an E divide by 64 clock subject to the AIN 4 pin being active.

Figure 10:
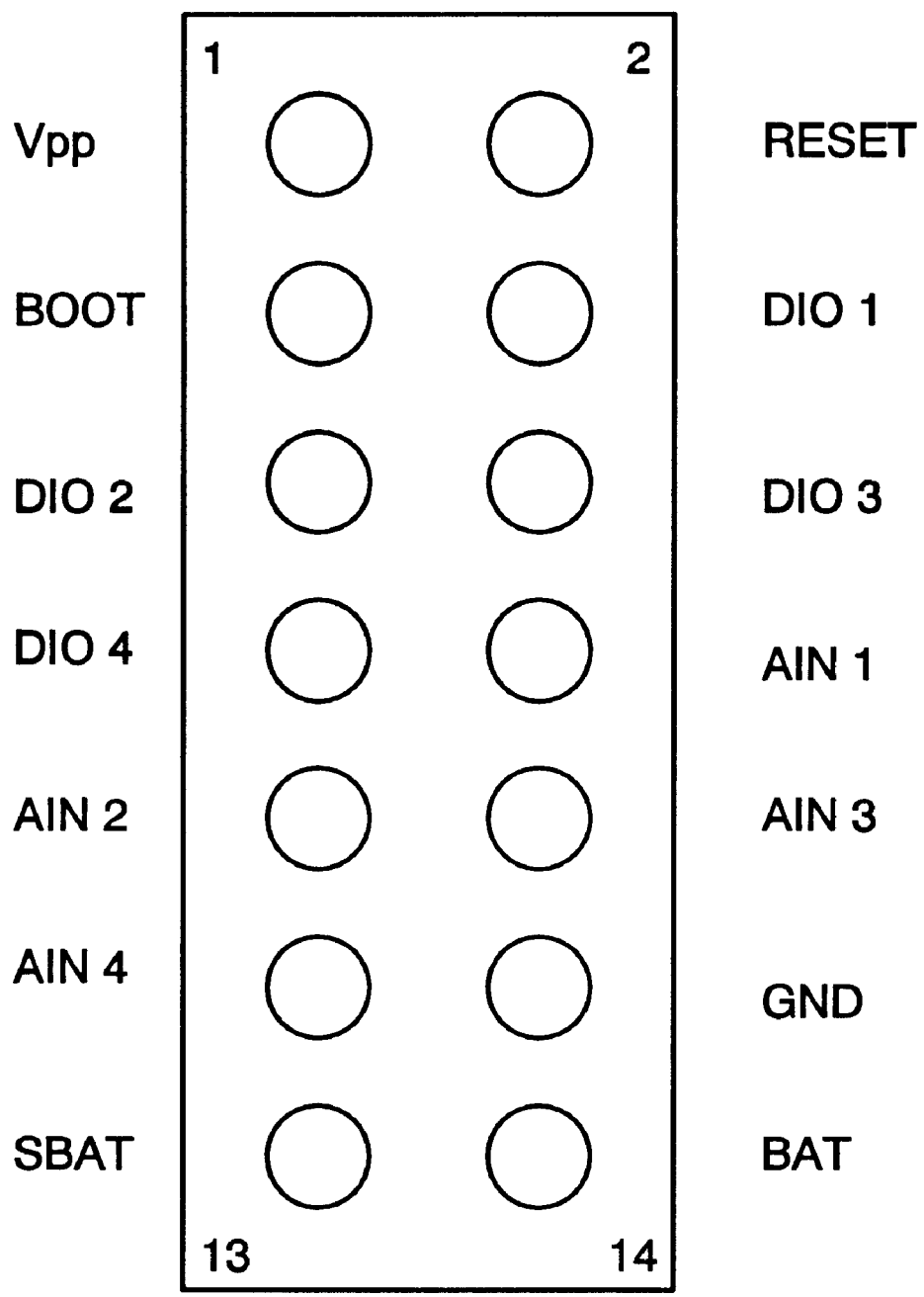
FIG. 10 illustrates the pin layout on the I/O interface connector 204.

FIG. 10 illustrates the pin layout on the I/O interface connector 204. The I/O interface connector 204 on the microprocessor 212 is a conventional 14-pin Harwin connector, which is well known in the art. The following Table 1 describes the pin descriptions for the I/O interface connector 204.

TABLE 1

| Pin Name | Input | Output | Functions | Description |
| --- | --- | --- | --- | --- |
| 1 XIRQ/ Vpp | X | | NMI | The XIRQ pin provides a means of requesting a non-maskable interrupt, and, with some additional circuitry, to trigger external event user functions. Vpp is the programming voltage. |
| 2 RESET | X | X | CPU Reset | A bi-directional control signal, RESET acts as an input to initialize the CPU to a known startup state. It also acts as an open-drain output to indicate that an internal failure has been detected in either the clock or COP watchdog. |
| 3 BOOT | X | | Boot Loader | If held at level zero after the RESET pin is toggled low, the micro-controller enters boot mode. Special PC software can modify internal parameters and modes. In conjunction with the Vpp, the OTP can also be programmed |
| 4 DIO 1 | X | X | Digital I/O | This general-purpose, bi-directional I/O |

TABLE 1-continued

| Pin Name | Input | Output | Functions | Description |
|---|---|---|---|---|
| | | | or SCI - RxD or SPI - MOSI | pin can be individually configured as Input or Output. When the Serial communication interface (SCI) receiver is enabled, this pin becomes an Input dedicated to the RxD function. When the Serial Peripheral Interface is enabled, this pin becomes dedicated to the MOSI function (in SPI Master Mode). |
| 5 DIO 2 | X | X | Digital I/O or SCI - TxD or SPI - MISO | This general-purpose, bi-directional I/O pin can be individually configured as Input or Output. When the Serial communication interface (SCI) receiver is enabled, this pin becomes an Output dedicated to the TxD function. When the Serial Peripheral Interface is enabled, this pin becomes dedicated to the MISO function (in SPI Master Mode). |
| 6 DIO 3 | X | X | Digital I/O or SCI - CTS SPI - SCK | This general-purpose, bi-directional I/O pin can be individually configured as Input or Output. When the Serial communication interface (SCI) receiver is enabled, this pin becomes an Output dedicated to the CTS function. When the Serial Peripheral Interface is enabled, this pin becomes dedicated to the SCK function (in SPI Master Mode). |
| 7 DIO 4 | X | X | Digital I/O or SCI - RTS SPI - SS | This general-purpose, bi-directional I/O pin can be individually configured as Input or Output. When the Serial communication interface (SCI) receiver is enabled, this pin becomes an input dedicated to the RTS function. When the Serial Peripheral Interface is enabled, this pin becomes dedicated to the SS (Slave Select) function (in SPI Master Mode). |
| 8 AIN 1 | X | | Analog Input or Timer/Input Capture | This pin is used as an A/D Analog Input or timer. Each pin operates independently from the other, and may be configured as Analog Input, input timer, input capture or edge-detect. |
| 9 AIN 2 | X | | Analog Input or Timer/Input Capture | This pin is used as an Analog Input or timer. Each pin operates independently from the other, and may be configured as Analog Input, input timer, input capture or edge-detect. |
| 10 AIN 3 | X | X | Analog Input or Digital I/O or Output Compare | This pin is used as a general purpose I/O or A/D analog I/O, timer or output compare. Each pin operates independently from the other, and may be configured as Analog, Digital I/O, output compare or edge-detect. |
| 11 AIN 4 | X | X | Analog I/O or Digital I/O or Pulse Accumulator or Output Compare | This pin is used as a general purpose I/O pin, pulse width modulation, or a pulse accumulator. Each pin operates independently from the other, and may be configured as Analog, Digital I/O, input timer or edge-detect, pulse width modulator or pulse detect. |
| 12 GND | X | X | GND | Ground |
| 13 SBAT | | X | Sensor Power | This pin provides switched power to external sensors that may be connected to the unit. This power is current-limited. |
| 14 BATT | X | | 5.0–7.0 VDC | This is the Power input pin. |

Figure 11:
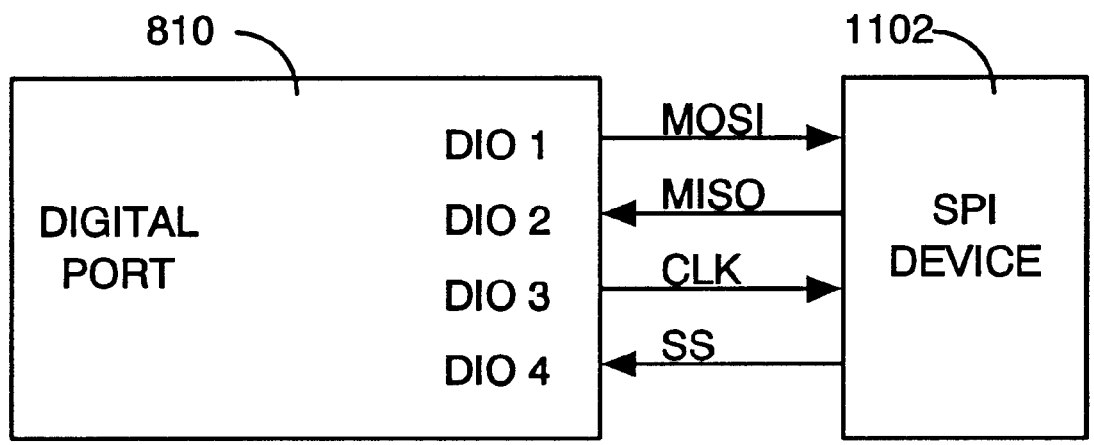
FIG. 11 illustrates the synchronous serial peripheral bus used in the preferred embodiment.

FIG. 11 illustrates the synchronous serial peripheral bus used in this embodiment. The sychronous peripheral interface (SPI) bus, an independent serial communications subsystem, allows the micro-controller to communicate synchronously with Peripheral devices, from simple TTL logic gates, to complex subsystems, such as LCD's and A/D subsystems and other microprocessors. When configured as a master, data transfer can be as high as one-half the clock rate. During an SPI transfer, data is simultaneously transmitted and received. A serial clock line synchronizes the shifting and sampling of the data on both serial data lines. On a master SPI device, the select line can optionally be used to indicate a multiple master bus contention. In the preferred embodiment, the four Digital I/O pins are used for SPI transfers as shown below in Table 2.

TABLE 2

| | |
|---|---|
| DIO 1 - MOSI | The MOSI line is one of the two unidirectional serial data signals. It is an output from a master device. The Master device places data on the MOSI line a half-cycle before the clock edge that the slave device uses to latch the data. |
| DIO 2 - MISO | MISO is the second of two unidirectional serial data signals. It is an input to a master device. The MISO line of a slave device is placed in the high impedance state if the slave device is not selected. |
| DIO 3 - SCK | SCK is generated by the master device and synchronizes data movement in and out of the device through the MOSI and MISO lines. Master and slave devices are capable of exchanging a byte of information during a sequence of eight clock cycles. |
| DIO 4 - SS | The SS line of the Master must be held high. If it goes low, this indicates an error condition. |

The DC electrical characteristics of the preferred embodiment of DA 102 are listed below in Table 3.

TABLE 3

| Characteristics | | Symbol | Min | Max | Unit |
|---|---|---|---|---|---|
| Supply Voltage | | $V_{DD}$ | 5.5 | 7.0 | V |
| Output Voltage(Note 1) | All Outputs | $V_{OL}$ | — | 0.1 | V |
| | All Outputs except $\overline{RESET}$ | $V_{OH}$ | $V_{DD}$ - 0.1 | — | |
| $I_{load} = \pm 10.0~\mu A$ | | | | | |
| Output High Voltage(Note 1) | All Outputs except $\overline{RESET}$ | $V_{OH}$ | $V_{DD}$ - 0.8 | — | V |
| $I_{load} = 0.8~mA, V_{DD} = 4.5~V$ | | | | | |
| Output Low Voltage(Note 1) | All Outputs | $V_{OL}$ | — | 0.4 | V |
| $I_{load} = 1.6~mA$ | | | | | |
| Input High Voltage | All Inputs except $\overline{RESET}$ | $V_{IH}$ | $0.7 \times V_{DD}$ | $V_{DD}$ + 0.3 | V |
| | $\overline{RESET}$ | | $0.8 \times V_{DD}$ | $V_{DD}$ + 0.3 | |
| Input Low Voltage | All Inputs | $V_{IL}$ | $V_{SS}$ – 0.3 | $0.2 \times V_{DD}$ | V |
| I/O Ports, Three-State Leakage | AIN4, AIN3 | $I_{OZ}$ | — | ±10 | μA |
| $V_{IN} - V_{IH}$ or $V_{IL}$ | $\overline{RESET}$ | | | | |
| Input Leakage Current(Note 2) | | $I_{IN}$ | | | |
| $V_{IN} - V_{DD}$ or $V_{SS}$ | $\overline{XIRQ}$ | | — | ±1 | μA |
| $V_{IN} - V_{DD}$ or $V_{SS}$ | $\overline{BOOT}$ | | — | ±10 | μA |

Notes related to table 3, above:
1. $V_{OH}$ specification for $\overline{RESET}$ and TxD are not applicable because they are open-drain pins.
2. Refer to A/D specification for leakage current for Analog Port.

The timing characteristics of the preferred embodiment of DA 102 are listed below in Table 4.

TABLE 4

| Characteristics | Symbol | Min | Max | Unit |
|---|---|---|---|---|
| Reset Input Pulse Width | $PW_{RSTL}$ | | | $t_{cyc}$ |
| To Guarantee External Reset Vector | | 8 | — | |
| Minimum Input Time (Can be preempted by Internal Reset) | | 1 | — | |
| Interrupt Pulse Width(Note 1), IRQ Edge-Sensitive Mode | | 520 | — | nS |
| $PW_{IBO} = t_{CYC} + 20~ns$ | | | | |
| Wait recovery Start-up Time | $t_{WRS}$ | — | 4 | $t_{cyc}$ |
| Timer Pulse Width Input Capture Pulse Accumulator Input | $PW_{TIM}$ | 520 | — | nS |
| $PWTIM = t_{cyc} + 20~ns$ | | | | |

In the preferred embodiment, $t_{cyc}$=813 nS.

Due to its use in a variety of physical environments, DA 102 is fabricated as an encapsulated device in the preferred embodiment to avoid exposure of its components to the elements. However, encapsulation creates a problem when initially developing software which is to be permanently stored in DA 102 or when debugging either the hardware or software. This is because analysis of the DA 102 can require the ability to examine signal points in the DA 102 which are inaccessible. Likewise, testing or debug of software which is in permanent or one time writeable storage would require that DA 102 be written to and then discarded for each test.

The disadvantage of encapsulation is the time and cost associated with development, testing or debugging of embedded microprocessors, such as microprocessor 212, and its software in this manner.

Under normal circumstances, microprocessor 212 is not physically accessible. Therefore, it is not possible to connect it to an emulator, probe it with test equipment, or repeatedly alter write once storage. In a device which is designed to be attachable to any number of I/O devices or software applications, the inability to test or debug without replacing the DA 102 for each test creates a serious problem for the tester. When DA 102 is used for an application, it is generally part of a larger system which may incorporate many different types of devices. The one time writeable software which is written to storage within DA 102 is not desirable for testing due to the need to replace the DA 102 for each test. The emulator microprocessor card 1206, discussed below in regard to FIG. 12, overcomes the problems associated with the encapsulation of microprocessor 212 which prevent its access for testing the hardware or altering the software.

Figure 12:
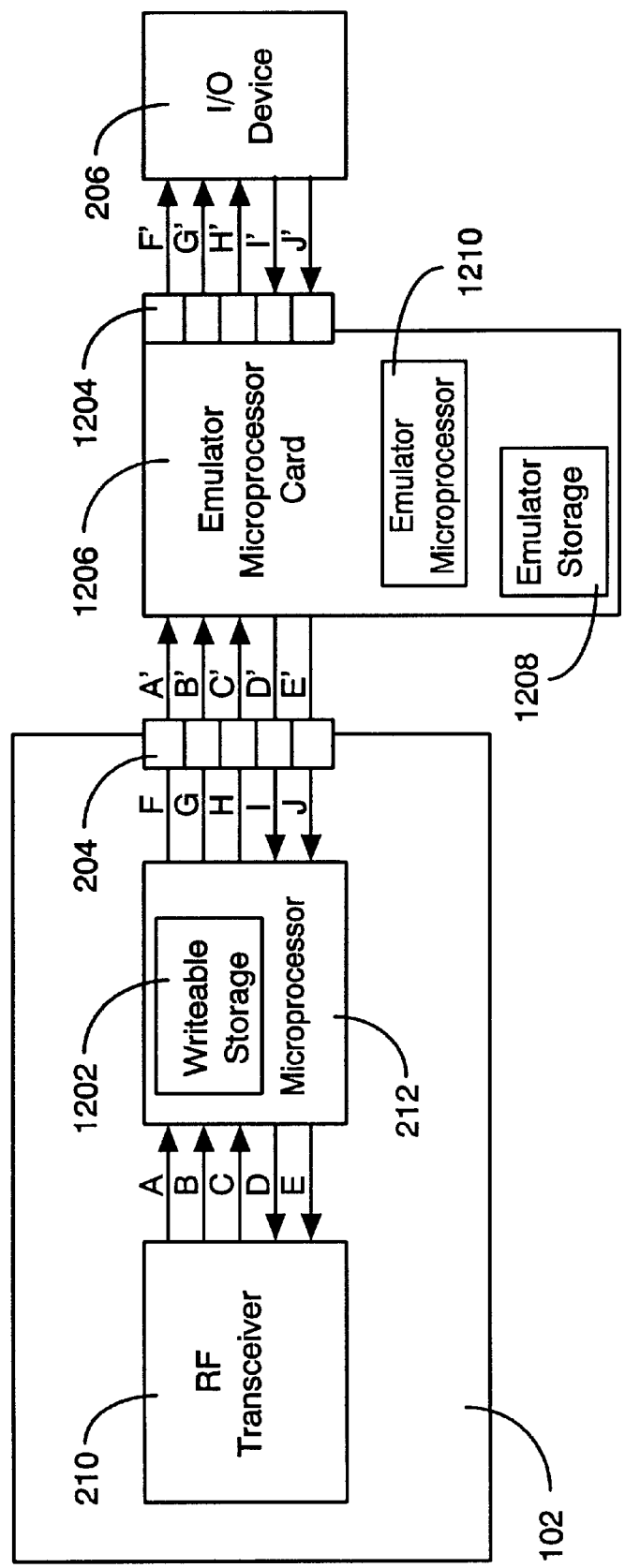
FIG. 12 illustrates the emulation processor card used to debug data acquisition device software prior to permanently storing it in the data acquisition device used in the preferred embodiment.

FIG. 12 illustrates the preferred solution to this problem. The software and hardware in the DA 102 is bypassed by external software and hardware which can be altered and tested outside of the encapsulated DA 102. This is accomplished by a pass through (or bypass) function in microprocessor 212 that permits the one time writeable storage and processor 212 in the DA 102 to be bypassed with an external emulator microprocessor 1206 card that has an emulator microprocessor 1210 and writeable emulator storage 1208. The emulator microprocessor 1210 is equivalent to the processor in the DA 102. This allows the tester to probe signal points on the microprocessor 1210 which would not be accessible on the microprocessor 212. In addition, the emulator storage 1208 on the external card is re-writeable. Thus, the tester can make any number of alterations to the software to ensure that it is working properly.

The emulator microprocessor card 1206 has an emulator I/O connector 1204 which is identical to I/O connector 204. Therefore, an I/O device 206 can be attached to emulator microprocessor card 1206 via emulator I/O connector 1204 in the same manner as it would be attached to DA 102. In turn, emulator microprocessor card 1206 is attached to DA 102 via I/O connector 206.

By attaching emulator microprocessor card 1206 to DA 102 in this manner, emulator microprocessor card 1206 is able to use the RF transceiver 210 in DA 102. As a result, the emulator microprocessor card 1206 is fabricated with a minimum amount of complexity and cost. Since DA 102 is encapsulated, the microprocessor 212 cannot be removed from the data path between the RF transceiver 210 and the I/O device 206. In order to allow the software and hardware to be properly tested, microprocessor 212 must be bypassed. This is accomplished by using a small amount of writeable storage 1202 in DA 102. Bypass software is downloaded into writeable storage 1202 prior to testing. By way of example, signal lines A–E represent data and control lines which connect RF transceiver 210 to microprocessor 212 in normal use. Likewise, lines F–J represent data and control lines which connect microprocessor 212 to I/O connector 204 in normal use. In turn, I/O connector 204 attached to I/O device 206 normally.

When emulator microprocessor card 1206 is installed, I/O device 206 is attached to emulator I/O connector 1204. Lines F'–J' are identical in content to lines F–J. Likewise, lines A–E to are identical in content to lines A'–E'. This is accomplished by the bypass software in writeable storage 1202 which feeds signals received on lines A–C directly to lines F–H without alteration, and feeds signals received on lines I–J directly to lines D–E without alteration. As a result of the bypass software in writeable storage 1202, signals are moved through microprocessor 212 without any modification by microprocessor 212. This effectively bypasses microprocessor 212 by presenting a mirror image of the signals which are normally input and output by microprocessor 212 to the inputs and outputs of emulator microprocessor 1210. Emulator microprocessor 1210 can be treated as if it were microprocessor 212 in this mode.

Since emulator microprocessor card 1206 is not encapsulated, it can be readily probed by test equipment, it can be connected to other emulator or test equipment (such as I/O device emulators, etc.), test software can be downloaded for development, etc. Further since emulator storage 1208 is re-writeable, it can be altered as much as necessary without the costs associated with testing the one time writeable storage in DA 102. Once the testing is completed, the software in writeable storage 1202 is disabled and DA 102 is returned to its normal operational configuration. At that point, the write once storage in DA 102 can be written with tested and operational code. This non-destructive debugging technique reduces both the cost and required time of application development for DA 102.

Lines A–J and A'–J' are intended as illustrative examples of how the microprocessor 212 can be bypassed by an emulator microprocessor card 1206. Those skilled in the art will recognize that any number of lines can be bypassed in this manner for a given microprocessor type.

While the invention has been described with respect to a preferred embodiment thereof, it will be understood by those skilled in the art that various changes in detail may be made therein without departing from the spirit, scope, and teaching of the invention. For example, the communication protocols may be anything suitable for transmission of data between remote locations. The communication means can be an RF transceiver, separate transmitters and receivers, or any suitable transmission medium other than RF, such as infrared, microwave, etc. Application programs can be implemented in hardware or software. The number of devices and configuration of the system can vary. Accordingly, the invention herein disclosed is to be limited only as specified in the following claims.

We claim:

1. An RF telemetry system for transferring data between remotely located data acquisition devices and application programs, further comprising:

at least one remotely located data acquisition device, further comprising:
an I/O interface connector having means to attach to, and transfer data to and from, an I/O device;
an RF transceiver for transferring data to and from a data collection system;
a primary cache to hold data transferred to and from the I/O device and to and from the data collection system;
a microprocessor having means to control communication between the data acquisition device and the I/O device and means to control communication between the data acquisition device and the data collection system; and
programmable storage for use by the microprocessor; and at least one data collection system, further comprising:
means to transfer data to and from at least one application program;
a secondary cache to hold data transferred to and from the remotely located data acquisition device;
a processor having means to control communication between the data collection system and the application program and means to control communication between the data collection system and the data acquisition device; and
programmable storage for use by the processor;

whereby data received by the data acquisition device from an I/O device is stored in the primary cache of the data acquisition device until transferred to the data collection system and then stored in the secondary cache until transferred to an application program.

2. A system, as in claim 1, further comprising:

CRC encryption means, further comprising:
means to generate CRC information for data;
means to encrypt the CRC information; and
means to attach the encrypted CRC information to the data prior to transmission; and CRC decryption means, further comprising:
means to read the encrypted CRC information attached to the transmitted data;
means to decrypt the CRC information; and
means to use the decrypted CRC data to determine if the received data is valid.

3. A system, as in claim 2, wherein:
the data collection system further comprises:
   first pincode storage for storage of a first predetermined pincode; and
   means encrypt the CRC information with the first predetermined pincode; and
the data acquisition device further comprises:
   second pincode storage for storage of a second predetermined pincode; and
   means to decrypt the CRC information with the second predetermined pincode.

4. A system, as in claim 3, wherein:
the first predetermined pincode is stored in the data collection system and not transmitted to the data acquisition device; and
the second predetermined pincode is stored in the data acquisition device and not transmitted to the data collection system.

5. A system, as in claim 4, wherein the means to decrypt the CRC information and the data further comprises forward error correction means.

6. A system, as in claim 1, wherein the data acquisition device further comprises:
a low power microcontroller, the microcontroller further comprising:
   means to deactivate the microprocessor by placing it in a low power state;
   means to monitor the RF transceiver for signals requesting data; and
   means to activate the microprocessor when a signal requesting data is received.

7. A system, as in claim 1, wherein the data acquisition device further comprises:
power management means, further comprising:
   means to place the data acquisition device in a transmit mode when the RF transceiver is transmitting data;
   means to place the data acquisition device in a data monitoring mode such that the RF transceiver is continuously monitoring for data;
   means to place the data acquisition device in a normal mode such that the RF transceiver and microprocessor are both kept in a low power SLEEP mode, and are activated at predetermined times; and
   means to place the data acquisition device in a power saver mode such that the RF transceiver and microprocessor are both kept in a low power SLEEP mode, and microprocessor is activated at predetermined times; the RF transceiver is activated under control of the microprocessor.

8. A system, as in claim 7, wherein the data acquisition device further comprises:
digital pattern recognition means is used to recognize the received data;
digital signal strength detection means to control RF transceiver power levels; and
and digital filtering means to detect the presence of a valid RF carrier signal.

9. A system, as in claim 1, wherein the data acquisition device further comprises:
digital pattern recognition means is used to recognize the received data;
digital signal strength detection means to control RF transceiver power levels; and
digital filtering means to detect the presence of a valid RF carrier signal.

10. A system, as in claim 1, further comprising:
an I/O device attached to the data acquisition device;
the data acquisition device further comprises integral network communications software; and
the integral network communications software can be modified from the data collection system or the I/O device.

11. A system, as in claim 1, wherein the data acquisition system further comprises:
writeable storage, the writeable storage having programmable means to bypass the microprocessor by mirroring signals from the RF transceiver on preselected input locations to preselected output locations on the I/O interface connector and mirroring signals received on preselected input locations of the I/O interface connector to preselected RF transceiver locations; and
an emulator microprocessor card, further comprising:
   data acquisition device connector means to connect the emulator microprocessor card to the data acquisition device;
   I/O device connector means to connect the emulator microprocessor card to the I/O device;
   an emulator microprocessor; and
   emulator storage for use by the emulator microprocessor;
whereby the microprocessor in the data acquisition device is bypassed and the emulator microprocessor controls the data acquisition device.

12. An RF telemetry system for transferring data between remotely located data acquisition devices and application programs, further comprising:
a plurality of remotely located data acquisition devices, each data acquisition device further comprising:
   an I/O interface connector having means to attach to, and transfer data to and from, an I/O device;
   an RF transceiver for transferring data to and from a data collection system;
   a primary cache to hold data transferred to and from the I/O device and to and from the data collection system;
   a microprocessor having means to control communication between the data acquisition device and the I/O device and means to control communication between the data acquisition device and the data collection system;
   means to communicate with and transfer data to other data acquisition devices;
   means to store data received from another data acquisition device in its primary cache;
   means to transfer data received from another data collection system to data collection system; and
   programmable storage for use by the microprocessor; and
at least one data collection system, further comprising:
   means to transfer data to and from at least one application program;
   a secondary cache to hold data transferred to and from the remotely located data acquisition device;
   a processor having means to control communication between the data collection system and the application program and means to control communication between the data collection system and the data acquisition device; and
   programmable storage for use by the processor;
whereby data received by the data acquisition device from an I/O device is stored in the primary cache of the data acquisition device until transferred to the data collection system and then stored in the secondary cache until transferred to an application program.

13. A system, as in claim 12, further comprising:
CRC encryption means, further comprising:
means to generate CRC information for data;
means to encrypt the CRC information; and
means to attach the encrypted CRC information to the data prior to transmission; and
CRC decryption means, further comprising:
means to read the encrypted CRC information attached to the transmitted data;
means to decrypt the CRC information; and
means to use the decrypted CRC data to determine if the received data is valid.

14. A system, as in claim 13, wherein:
the data collection system further comprises:
first pincode storage for storage of a first predetermined pincode; and
means encrypt the CRC information with the first predetermined pincode; and
the data acquisition device further comprises:
second pincode storage for storage of a second predetermined pincode; and
means to decrypt the CRC information with the second predetermined pincode.

15. A system, as in claim 14, wherein:
the first predetermined pincode is stored in the data collection system and not transmitted to the data acquisition device; and
the second predetermined pincode is stored in the data acquisition device and not transmitted to the data collection system.

16. A system, as in claim 15, wherein the means to decrypt the CRC information and the data further comprises forward error correction means.

17. A system, as in claim 12, wherein the data acquisition device further comprises:
a low power microcontroller, the microcontroller further comprising:
means to deactivate the microprocessor by placing it in a low power state;
means to monitor the RF transceiver for signals requesting data; and
means to activate the microprocessor when a signal requesting data is received.

18. A system, as in claim 12, wherein the data acquisition device further comprises:
power management means, further comprising:
means to place the data acquisition device in a transmit mode when the RF transceiver is transmitting data;
means to place the data acquisition device in a data monitoring mode such that the RF transceiver is continuously monitoring for data;
means to place the data acquisition device in a normal mode such that the RF transceiver and microprocessor are both kept in a low power SLEEP mode, and are activated at predetermined times; and
means to place the data acquisition device in a power saver mode such that the RF transceiver and microprocessor are both kept in a low power SLEEP mode, and microprocessor is activated at predetermined times; the RF transceiver is activated under control of the microprocessor.

19. A system, as in claim 18, wherein the data acquisition device further comprises:

digital pattern recognition means is used to recognize the received data;
digital signal strength detection means to control RF transceiver power levels; and
and digital filtering means to detect the presence of a valid RF carrier signal.

20. A system, as in claim 12, wherein the data acquisition device further comprises:
digital pattern recognition means is used to recognize the received data;
digital signal strength detection means to control RF transceiver power levels; and
and digital filtering means to detect the presence of a valid RF carrier signal.

21. A system, as in claim 12, further comprising:
an I/O device attached to the data acquisition device;
the data acquisition device further comprises integral network communications software; and
the integral network communications software can be modified from the data collection system or the I/O device.

22. A system, as in claim 12, wherein the data acquisition system further comprises:
writeable storage, the writeable storage having programmable means to bypass the microprocessor by mirroring signals from the RF transceiver on preselected input locations to preselected output locations on the I/O interface connector and mirroring signals received on preselected input locations of the I/O interface connector to preselected RF transceiver locations; and
an emulator microprocessor card, further comprising:
data acquisition device connector means to connect the emulator microprocessor card to the data acquisition device;
I/O device connector means to connect the emulator microprocessor card to the I/O device;
an emulator microprocessor; and
emulator storage for use by the emulator microprocessor;
whereby the microprocessor in the data acquisition device is bypassed and the emulator microprocessor controls the data acquisition device.

23. A method of transferring data between remotely located data acquisition devices and application programs in an RF telemetry system, including the steps of:
connecting an I/O device to a remotely located data acquisition device with an I/O interface connector;
storing data transferred to and from the I/O device in a primary cache in the remotely located data acquisition device;
transferring data to and from the primary cache of the remotely located data acquisition device to the data collection system with an RF transceiver;
storing data transferred to and from the remotely located data acquisition device in a secondary cache in the data collection system;
using a microprocessor to control communication between the remotely located data acquisition device and the I/O device and to control communication between the remotely located data acquisition device and the data collection system;
storing program instructions for use by the microprocessor in programmable storage; and
transferring data to and from the secondary cache and at least one application program;

whereby data received by the data acquisition device from an I/O device is stored in the primary cache of the data acquisition device until transferred to the data collection system and then stored in the secondary cache until transferred to an application program.

24. A method, as in claim 23, including the additional steps of using a data collection system with a predetermined transmission range;

locating a first data acquisition device outside of the transmission range of the data collection system;

locating a second data acquisition device within the transmission range of the data collection system; and transmitting data from the first data acquisition device to the second data acquisition device and then re-transmitting the data from the second data acquisition device to the data collection system;

whereby data acquisition devices can be remotely located outside of the transmission range of a data collection.

25. A method, as in claim 23, including the additional steps of:

generating CRC information for data;

encrypting the CRC information;

attaching the encrypted CRC information to the data prior to transmission;

reading the encrypted CRC information attached to the received data;

decrypting the CRC information; and using the decrypted CRC data to determine if the received data is valid.

26. A method, as in claim 25, including the additional steps of:

storing a first predetermined pincode in a first pincode storage in the data collection system;

encrypting the CRC information with the first predetermined pincode;

storing a second predetermined pincode in a second pincode storage in the data acquisition device; and decrypting the CRC information with the second predetermined pincode.

27. A method, as in claim 23, including the additional steps of:

bypassing the microprocessor by mirroring signals from the RF transceiver on preselected input locations to preselected output locations on the I/O interface connector and mirroring signals received on preselected input locations of the I/O interface connector to preselected RF transceiver locations;

attaching an emulator microprocessor card between the data acquisition device and the I/O device; and emulating the microprocessor on the data acquisition device with an emulator microprocessor on the emulator microprocessor card;

whereby the microprocessor in the data acquisition device is bypassed and the emulator microprocessor controls the data acquisition device.

28. A method of transferring data between a remotely located data acquisition device and multiple independent application programs in an RF telemetry system, including the steps of:

connecting an I/O device to a data acquisition device with an I/O interface connector;

transferring data from an I/O device to the data acquisition device;

transferring data from the data acquisition device to the data collection system with an RF transceiver, the data acquisition device remotely located from the data collection system;

storing data transferred from the data acquisition device in the data collection system; and accessing the data in the data collection system from a plurality of application programs;

whereby data transferred from the data acquisition device to the data collection system is read by multiple independent application programs after a single data transfer from the data acquisition device.

29. A method, as in claim 28, including the additional steps of:

sharing access to the I/O device between at least two application programs;

executing at least one application program on a computer system which is remote from the data collection system; and transferring data between the remote computer system and the data collection system;

whereby I/O devices on the data acquisition device are shared by multiple independent application programs distributed over a hierarchal computer network.

* * * * *